US010853975B2

(12) United States Patent
Vosoughi et al.

(10) Patent No.: US 10,853,975 B2
(45) Date of Patent: Dec. 1, 2020

(54) HYBRID PROJECTION-BASED POINT CLOUD TEXTURE CODING

(71) Applicant: SONY CORPORATION, Tokyo (JP)

(72) Inventors: Arash Vosoughi, San Jose, CA (US); Danillo Graziosi, San Jose, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/246,975

(22) Filed: Jan. 14, 2019

(65) Prior Publication Data

US 2019/0236810 A1 Aug. 1, 2019

Related U.S. Application Data (60) Provisional application No. 62/622,410, filed on Jan. 26, 2018.

(51) Int. Cl.
*G06T 15/00* (2011.01)
*G06T 9/40* (2006.01)
(Continued)

(52) U.S. Cl.
CPC ............... *G06T 9/40* (2013.01); *G06T 15/04* (2013.01); *G06T 15/40* (2013.01); *G06T 2200/16* (2013.01); *H04L 67/04* (2013.01)

(58) Field of Classification Search
CPC ........... G06T 15/04; G06T 9/40; G06T 15/40; G06T 2200/16; H04L 67/10; H04L 67/04; H04L 67/12
(Continued)

(56) References Cited

U.S. PATENT DOCUMENTS 7,006,683 B2 * 2/2006 Brand ..................... G06T 7/579
345/419
8,022,951 B2 9/2011 Zhirkov et al.
(Continued)

FOREIGN PATENT DOCUMENTS

EP 1321894 B1 11/2011
WO 2015/183550 A1 12/2015

OTHER PUBLICATIONS

Pollefeys M, Koch R, Vergauwen M, Van Gool L. Hand-held acquisition of 3D models with a video camera. InSecond International Conference on 3-D Digital Imaging and Modeling (Cat. No. PR00062) Oct. 8, 1999 (pp. 14-23). IEEE.*
(Continued)

*Primary Examiner* — Phu K Nguyen
(74) *Attorney, Agent, or Firm* — Chip Law Group (57) ABSTRACT

An apparatus receives a video which includes at least one three-dimensional (3D) object in a 3D physical space. A 3D geometrical representation of a point cloud is generated based on the video. The 3D geometrical representation of the point cloud includes a first set of points associated with geometrical information and texture information corresponding to the at least one 3D object. A plurality of two-dimensional (2D) projections are generated from the 3D geometrical representation of the point cloud. A second set of points that are occluded in the first set of points is detected, corresponding to the plurality of 2D projections. The plurality of 2D projections and the second set of points are distinctly encoded, and the remaining points, other than the detected second set of points, in the first set of points are discarded for efficient compression of the 3D geometrical representation of the point cloud.

20 Claims, 4 Drawing Sheets

(51) Int. Cl.
    *G06T 15/40*    (2011.01)
    *G06T 15/04*    (2011.01)
    *H04L 29/08*    (2006.01)

(58) Field of Classification Search
    USPC .......................................................... 345/418
    See application file for complete search history.

(56) References Cited

U.S. PATENT DOCUMENTS

| | | | | |
|---|---|---|---|---|
| 8,160,400 | B2* | 4/2012 | Snavely | G06K 9/00637 |
| | | | | 382/305 |
| 8,260,584 | B2* | 9/2012 | Adachi | G06T 17/00 |
| | | | | 382/181 |
| 8,744,214 | B2* | 6/2014 | Snavely | G06K 9/00637 |
| | | | | 382/284 |
| 9,704,055 | B2 | 7/2017 | Holverda et al. | |
| 9,747,668 | B2* | 8/2017 | Yucer | G06T 7/579 |
| 10,109,055 | B2* | 10/2018 | Xu | H04N 13/239 |
| 10,262,424 | B2* | 4/2019 | Ketcha | G06T 7/33 |
| 10,360,718 | B2* | 7/2019 | Chernov | G06T 7/579 |
| 2014/0204088 | A1 | 7/2014 | Kirk et al. | |
| 2016/0044301 | A1 | 2/2016 | Jovanovich et al. | |
| 2016/0364903 | A1 | 12/2016 | Gordon et al. | |
| 2017/0347120 | A1 | 11/2017 | Chou et al. | |
| 2018/0205926 | A1* | 7/2018 | Mogalapalli | G06T 7/521 |
| 2019/0236810 | A1* | 8/2019 | Vosoughi | G06T 15/04 |
| 2019/0392198 | A1* | 12/2019 | Jillela | G06T 19/20 |
| 2020/0045249 | A1* | 2/2020 | Francois | G06K 9/4633 |
| 2020/0045285 | A1* | 2/2020 | Varerkar | H04N 13/111 |

OTHER PUBLICATIONS

Bernardini F, Rushmeier H. The 3D model acquisition pipeline. InComputer graphics forum Jun. 2002 (vol. 21, No. 2, pp. 149-172). Oxford, UK: Blackwell Publishers Ltd.*
Berger M, Tagliasacchi A, Seversky LM, Alliez P, Guennebaud G, Levine JA, Sharf A, Silva CT. A survey of surface reconstruction from point clouds. InComputer Graphics Forum Jan. 2017 (vol. 36, No. 1, pp. 301-329).*
Toldo, Towards automatic acquisition of high-level 3D models from images, Universita degli Studi di Verona, Ph.D. Thesis, 2013.*
Nuchter, 3D point Cloud Processing; University of Wurzburg, Robotics and telematics, Oct. 22, 2013.*
Xia Y, Zhang Y, Zhou D, Huang X, Wang C, Yang R. Realpoint3d: Point cloud generation from a single image with complex background. arXiv preprint arXiv:1809.02743. Sep. 8, 2018.*
Bernardini, et al., "The 3D Model Acquisition Pipeline", Computer graphics Forum, vol. 21, No. 2, Aug. 9, 2002, pp. 149-172.
Brox, et al., "Combined Region and Motion-Based 3D Tracking of Rigid and Articulated Objects", IEEE Transaction on pattern Analysis and machine Intelligence, vol. 32, No. 3, Mar. 2010, pp. 402-415.
International Search Report and Written Opinion of PCT Application No. PCT/US 2019/014960, dated Jul. 11, 2019, 10 pages of ISRWO.
Pang, et al., "Fast and Robust Multi-View 3D Object Recognition in Point Clouds", 09 pages.

* cited by examiner

HYBRID PROJECTION-BASED POINT CLOUD TEXTURE CODING

CROSS-REFERENCE TO RELATED APPLICATIONS/INCORPORATION BY REFERENCE

This application claims priority to U.S. Provisional Patent Application Ser. No. 62/622,410 filed on Jan. 26, 2018, the entire content of which is hereby incorporated herein by reference.

FIELD

Various embodiments of the disclosure relate to encoding of three-dimensional (3D) modeling and compression technologies. More specifically, various embodiments of the disclosure relate to an apparatus and method for hybrid projection-based point cloud texture coding.

BACKGROUND

Recent advancements in the field of three-dimensional (3D) modeling technologies have provided the ability to create 3D geometrical representations of 3D objects. Point clouds are one example of the 3D geometrical representations, which are increasingly being adopted for different applications, such as free viewpoint display for sports or a live event relay broadcasting, geographic information systems, cultural heritage representations, and autonomous navigation. Typically, point clouds may include unstructured 3D points (e.g., each point having X, Y, and Z coordinates) along with associated attributes, for example, texture including colors or reflectance. A 3D scene described by a point cloud may contain order of magnitudes of raw data, which makes data storage, processing, and transmission a challenging task for any practical application. Thus, it may be desirable to have an efficient point cloud compression technology.

Currently, two different approaches are used for point cloud compression. In a first geometry-centric approach, a conventional 3D encoding architecture may be used, which explores a spatial relationship between neighboring points of 3D point cloud for compression, which may not be efficient for compression for moving or deforming objects. In a second projected two-dimensional (2D) texture-centric approach, a conventional two-dimensional (2D) encoder may be used, which utilizes 2D projections and video codecs for compression. As a result of the 2D projections, some points of the 3D point cloud may get occluded. Therefore, the 2D encoder may be incapable of encoding the complete 3D point cloud, and significant information may be lost, which results in distortion at the time of reconstruction of the 3D point cloud by a decoder.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for hybrid projection-based point cloud texture coding is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for hybrid projection-based point cloud texture coding. Exemplary aspects of the disclosure may include an apparatus that may be configured to receive a video that may include at least one three-dimensional (3D) object. The apparatus may further generate a 3D geometrical representation of a point cloud based on the received video. The generated 3D geometrical representation of the point cloud may comprise a first set of points associated with geometrical information and texture information of the at least one 3D object. The apparatus further may generate a plurality of two-dimensional (2D) projections from the 3D geometrical representation of the point cloud. The apparatus may further detect a second set of points of the first set of points that may be occluded during generation of the plurality of 2D projections. The apparatus may further distinctly encode the plurality of 2D projections and the second set of points whereas the remaining points other than the second set of points in the first set of points may be discarded during the encoding operation. The distinct encoding of the plurality of 2D projections and the second set of points results in compression of the 3D geometrical representation of the point cloud for a scene without any degradation or compromise in quality. The disclosed apparatus further provides a solution to improve accuracy in encoding the 3D geometrical representation of the point cloud based on the distinct encoding using distinct encoding of the plurality of 2D projections and the second set of points (occluded points in the plurality of 2D projections). The disclosed apparatus further provides reduced bandwidth utilization for transmission of the 3D geometrical representation of the point cloud using distinct encoding of the plurality of 2D projections and the second set of points. Since only the second set of points that are occluded are encoded along with the plurality of 2D projections, a significant processing-power savings is achieved.

Figure 1:
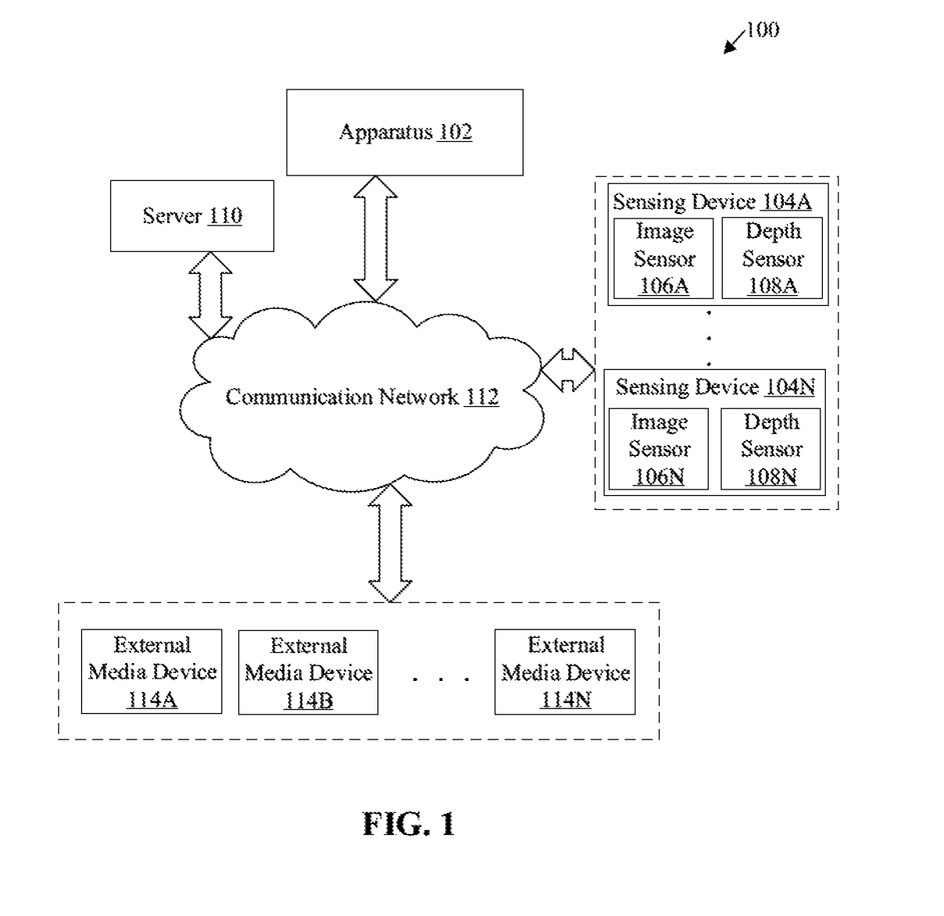
FIG. 1 is a block diagram that illustrates an exemplary network environment for hybrid projection-based point cloud texture coding, in accordance with an embodiment of the disclosure.

FIG. 1 is a block diagram that illustrates an exemplary network environment for hybrid projection-based point cloud texture coding, in accordance with an embodiment of the disclosure. With reference to FIG. 1, there is shown a network environment 100. The network environment 100 may include an apparatus 102 and a plurality of sensing devices 104A to 104N. Each of the plurality of sensing devices 104A to 104N may include an image sensor 106A and a depth sensor 108A. The network environment 100 may further include a server 110, a communication network 112 and a plurality of external media devices 114A, 114B, . . . , 114N. The apparatus 102 may be communicatively coupled to the plurality of sensing devices 104A to 104N, the server 110, and the plurality of external media devices 114A, 114B, . . . , 114N, via the communication network 112.

The apparatus 102 may comprise suitable logic, circuitry, interfaces, and/or code that may be configured to generate a 3D geometrical representation (such as a 3D point cloud) of a scene. The 3D geometrical representation of the scene may be a 3D point cloud, and may include 3D representations of one or more 3D objects in a 3D physical space. Examples of the apparatus 102 may include, but are not limited to, a video broadcasting system, a video-conferencing system, an augmented reality-based device, a gaming device, a mainframe machine, a server, a computing device, and/or a consumer electronic (CE) device.

Each of the plurality of sensing devices 104 to 104N may comprise suitable logic, circuitry, interfaces, and/or code that may be configured to capture a video and corresponding depth information of the one or more 3D objects in the 3D physical space. In accordance with an embodiment, each of the plurality of sensing devices 104A to 104N may be positioned at suitable locations in the 3D physical space to enable capturing a 360 degree view of the one or more 3D objects in the 3D physical space. Each of the plurality of sensing devices 104A to 104N may be configured to transmit the captured video and corresponding depth information to the apparatus 102, via the communication network 112. Each of the plurality of sensing devices 104A to 104N may comprise a plurality of sensors, such as a combination of a depth sensor, a color sensor, (such as a red-green-blue (RGB) sensor), and/or an infrared (IR) sensor which may capture the video of the one or more 3D objects from different viewing angles. Examples of the each of the plurality of sensing devices 104A to 104N may include, but are not limited to, the depth sensor, the RGB sensor, the IR sensor, an image sensor, image capturing device, and/or a motion-detector device.

In accordance with an embodiment, the server 110 may be configured to receive the captured video of the one or more 3D objects in the 3D physical space, from the plurality of sensing devices 104A to 104N. The server 110 may be further configured to generate the 3D geometrical representation of the point cloud that may include the one or more 3D objects in the 3D space, based on the captured video. The server 110 may be further configured to store the generated 3D geometrical representation of the point cloud. Examples of the server 110 may include, but are not limited to, an application server, a cloud server, a web server, a database server, a file server, a gaming server, a mainframe server, or a combination thereof.

The communication network 112 may include a communication medium through which the apparatus 102 may be communicatively coupled to the plurality of sensing devices 104A to 104N, the server 110, and the plurality of external media devices 114A, 114B, . . . , 114N. Examples of the communication network 112 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), EDGE, IEEE 802.11, Light Fidelity (Li-Fi), 802.16, IEEE 802.11s, IEEE 802.11g, multi-hop communication, wireless access point (AP), device to device communication, cellular communication protocols, and/or a combination thereof.

Each of the plurality of external media devices 114A, 114B, . . . , 114N may comprise suitable logic, circuitry and interfaces that may be configured to communicate with the apparatus 102, via the communication network 112. In accordance with an embodiment, each of the plurality of external media devices 114A, 114B, . . . , 114N may be configured to receive 3D content (as multimedia content) from the apparatus 102, via the communication network 112 based on corresponding content rendering capability. The plurality of external media devices 114A, 114B, . . . , 114N may be further configured to render the received multimedia content. Examples of the plurality of external media devices 114A, 114B, . . . , 114N may include, but are not limited to, a display system, a computing device, a gaming device, a mobile phone, a television, or an electronic device with capability to store or render the multimedia content.

In operation, each of the plurality of sensing devices 104A to 104N may be configured to capture the video and corresponding depth information of one or more 3D objects in a 3D physical space from different viewing angles. Each of the plurality of image sensors 106A to 106N corresponding to each of the plurality of sensing devices 104A to 104N may be configured to capture the video of the one or more 3D objects in the 3D physical space. The captured video may include attribute information of the one or more 3D objects in the 3D physical space. The attribute information may include, for example, texture information (which may include colour and reflectance). Each of the plurality of depth sensors 108A to 108N may be configured to capture the corresponding depth information of the one or more 3D objects in a field of view (FOV) of each of the plurality of sensing devices 104A to 104N at the time of capture of the video. The captured depth information of the one or more 3D objects may include geometrical information about 3D coordinates of the one or more users in the 3D physical space. The captured video and the corresponding depth information may be aligned with each other such that the captured video and the corresponding depth information of the one or more 3D objects may be captured together at a same time and may represent the same FOV. In some embodiments, the apparatus 102 may be configured to receive the captured video and the corresponding depth information of the one or more 3D objects captured by the plurality of sensing devices 104A to 104N, via the communication network 112.

The server 110 may be configured to receive the captured video from each of the plurality of sensing devices 104A to 104N via the communication network 112. The server 110 may be further configured to generate a 3D geometrical representation of the point cloud based on the captured video and the corresponding depth information. In some embodiments, the server 110 may be configured to generate the 3D geometrical representation of the point cloud based on the captured video and the corresponding depth information corresponding to only one of the plurality of sensing devices 104A to 104N. The 3D geometrical representation of the point cloud may be generated using 3D modelling techniques, known in the art. The 3D geometrical representation of the point cloud may include a first set of points associated with geometrical information (e.g., the 3D coordinates) and texture information corresponding to the at least one 3D object of the one or more 3D objects. The texture information may be the attribute information of at least one 3D object of the one or more 3D objects. The 3D geometrical representation of the point cloud may be generated to represent an external surface and shape of the one or more 3D objects. The first set of points may be a collection of points that defines shapes, position, and a pose of at least one 3D object in the 3D physical space.

The apparatus 102 may be configured to receive the 3D geometrical representation of the point cloud from the server 110, via the communication network 112. In some embodiments, instead of the server 110, the apparatus 102 may be configured to generate the 3D geometrical representation of the point cloud. The apparatus 102 may be further configured to generate a plurality of two-dimensional (2D) projections from the 3D geometrical representation of the point cloud. The plurality of two-dimensional (2D) projections may be generated using conventional point cloud description techniques such as Multiview 2D Projection (M2DP) algorithm. In accordance with an embodiment, the 3D geometrical representation of the point cloud may include texture of the one or more 3D objects, where the texture may be associated with geometry (i.e. 3D coordinates) of the one or more 3D objects. The apparatus 102 may be configured to project the texture of the 3D geometrical representation of the point cloud on a specified 2D plane based on the texture information of the one or more 3D objects. The 2D projections may be 2D images that may be generated based on the projection of the texture of the 3D geometrical representation of the point cloud on the specified plane. Each 2D projection from the plurality of 2D projections may represent a projection of the texture from a first viewing angle (i.e., one viewing angle) of a plurality of different viewing angles of the 3D geometrical representation of the point cloud of the one or more 3D objects.

The apparatus 102 may be further configured to detect a second set of points from the first set of points of the 3D geometrical representation of the point cloud. The second set of points may correspond to points (i.e., a set of invisible points) that may be occluded in the first set of points in the plurality of 2D projections.

The apparatus 102 may be further configured to distinctly encode the plurality of 2D projections and the detected second set of points. The apparatus 102 may be configured to discard remaining points in the first set of points of the 3D geometrical representation of the point cloud, other than the detected second set of points during the encoding operation. The plurality of 2D projections may be encoded by using one of a plurality of 2D image encoding techniques, such as H.264, Joint Photographic Experts Group (JPEG) method, Moving Picture Expert Group-4 (MPEG-4) encoding method, or other 2D image/video encoding technique. The second set of points (i.e., the set of invisible points) may be encoded by using one of a plurality of 3D object encoding techniques, such as Context-Adaptive Binary Arithmetic Coding (CABAC), Regional Adaptive Hierarchical Transform (RAHT), 7-Zip, Joint Photographic Experts Group (JPEG) encoding method, or a custom 3D object encoding technique.

The apparatus 102 may be further configured to transmit a bit stream that includes the encoded first plurality of 2D projections and only the encoded second set of points to at least one of the plurality of external media device 114A, 114B, . . . , 114N. Such hybrid approach (i.e., one of the plurality of 2D image encoding technique for encoding of the plurality of 2D projections, and one of the plurality of 3D object encoding techniques for encoding only the set of invisible points) results in accurate and efficient compression of the 3D geometrical representation of the point cloud. A compressed 3D geometrical representation of the point cloud results in low bandwidth and low processing power consumption in transmission to the plurality of external media devices 114A, 114B, . . . , 114N. At the same time, a 3D representation of the 3D object in the 3D physical space may be reconstructed using the compressed 3D geometrical representation of the point cloud with higher accuracy as compared to conventional approaches of the point cloud compression.

Figure 2:
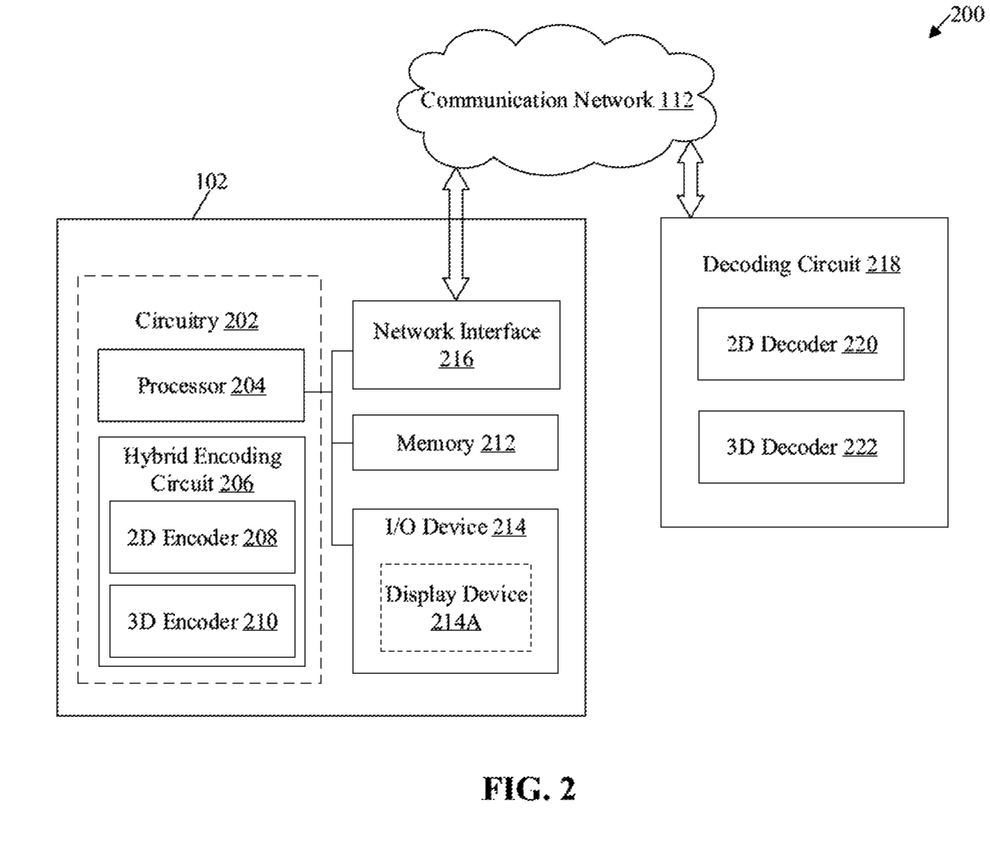
FIG. 2 is a block diagram that illustrates an exemplary apparatus for hybrid projection-based point cloud texture coding, in accordance with an embodiment of the disclosure.

FIG. 2 is a block diagram that illustrates an exemplary apparatus for hybrid projection-based point cloud texture coding, in accordance with an embodiment of the disclosure. FIG. 2 is explained in conjunction with elements from FIG. 1. With reference to FIG. 2, there is shown a block diagram 200 of the apparatus 102. The apparatus 102 may include circuitry 202 which may further include a processor 204 and a hybrid encoding circuit 206. The hybrid encoding circuit 206 may further include a 2D encoder 208 and a 3D encoder 210. The apparatus 102 may further include a memory 212 and an I/O device 214 that may further include a display device 214A. The apparatus 102 may also include a network interface 216. The circuitry 202 may be communicatively coupled to the memory 212, the I/O device 214, and the network interface 216. The circuitry 202 may be configured to communicate with the plurality sensing devices 104A to 104N, and the server 110, and the plurality of external media devices 114A, 114B, . . . , 114N, using the network interface 216. With reference to FIG. 2, there is further shown a decoding circuit 218 that may include a 2D decoder 220 and a 3D decoder 222. The circuitry 202 may be configured to communicate with the decoding circuit 218, via the communication network 112.

The processor 204 may comprise suitable logic, circuitry, and/or interfaces that may be configured to execute various operations involved in reception of the captured video and the depth information, and generation of the 3D geometrical representation of the point cloud, where the 3D geometrical representation of the point cloud corresponds to the one or more 3D objects in the 3D physical space. The processor 204 may be configured to generate the 3D geometrical representation of the point cloud of the one or more 3D objects in a real time, near-real time, or a lag time. The processor 204 may be further configured to generate the plurality of 2D projections from the 3D geometrical representation of the point cloud. The processor 204 may be configured to execute the various operations involved in transmission and reception of the 3D geometrical representation of the point cloud to at least one of the plurality of external media devices 114A, 114B, . . . , 114N. Examples of the processor 204 may be a Graphical Processing Unit (GPU), a Central Processing Unit (CPU), a Reduced Instruction Set Computing (RISC) processor, an Application-Specific Integrated Circuit (ASIC) processor, a Complex Instruction Set Computing (CISC) processor, other processors, and/or a combination thereof. In accordance with an embodiment, the processor 204 may be configured to control the hybrid encoding circuit 206, the memory 212, and the input/output (I/O) device 214 to control the one or more functions of the apparatus 102.

The 2D encoder 208 may comprise suitable logic, circuitry, and/or interfaces that may be configured to execute the various operations involved in encoding of the plurality of 2D projections that may be generated from the 3D geometrical representation of the point cloud. The 2D encoder 210 may encode the plurality of 2D projections, such as 2D images, based on one of the plurality of 2D image encoding techniques.

The 3D encoder 210 may comprise suitable logic, circuitry, and/or interfaces that may be configured to execute the various operations for encoding of the second set of points that may be occluded in plurality of 2D projections. The 3D encoder 210 may encode the second set of points based on one of the plurality of 3D object encoding techniques.

The memory 212 may comprise suitable logic, circuitry, and/or interfaces that may be configured to store a set of instructions executable by the circuitry 202. The memory 212 may be configured to store operating systems and associated applications. In accordance with an embodiment, the memory 212 may be further configured to store the 3D geometrical representation of the point cloud of the one or more 3D objects. Examples of implementation of the memory 212 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 214 may comprise suitable logic, circuitry, interfaces, and/or code that may be configured to receive an input from a user. The I/O device 214 may be further configured to provide an output to the user. The I/O device 214 may comprise various input and output devices, which may be configured to communicate with the circuitry 202. Examples of the input devices may include, but are not limited to, a touch screen, a keyboard, and/or a mouse. Examples of the output devices may include, but are not limited to, the display device 214A.

The display device 214A may comprise suitable logic, circuitry, interfaces, and/or code that may be configured to render the 3D geometrical representation of the point cloud. The display device 214A may be realized through several known technologies such as, but not limited to, at least one of a Liquid Crystal Display (LCD) display, a Light Emitting Diode (LED) display, a plasma display, and/or an Organic LED (OLED) display technology, and/or other display.

The network interface 216 may comprise suitable logic, circuitry, interfaces, and/or code that may be configured to establish communication between the apparatus 102, the plurality of sensing devices 104A to 104N, the server 110, and the plurality of external media devices 114A, 114B, . . . , 114N, via the communication network 112. The network interface 216 may be implemented by use of various known technologies to support wired or wireless communication by the apparatus 102 with the communication network 112. The network interface 216 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 216 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The 2D decoder 220 may comprise suitable logic, circuitry, and/or interfaces that may be configured to execute the various operations involved in decoding of the encoded plurality of 2D projections that may be encoded by the 2D encoder 208 in the apparatus 102. The 2D decoder 222 may decode the encoded plurality of 2D projections by selection of one of a plurality of 2D image decoding techniques known in the art that may be used to encode the plurality of 2D projections.

The 3D decoder 222 may comprise suitable logic, circuitry, and/or interfaces that may be configured to execute the various operations involved in decoding of the second set of points that may be encoded by the 3D encoder 210 in the apparatus 102. The 3D decoder 224 may decode the encoded second set of points based on a selected 3D object decoding technique.

In accordance with an embodiment, each of the 2D decoder 220 and the 3D decoder 222 may be included in each of the plurality of external media apparatus 114A, 114B, . . . , 114N, which may render the decoded plurality of 2D projections and the set of invisible points such that a 3D representation of the object(s) (that was encoded) is reconstructed with high accuracy.

Figure 3:
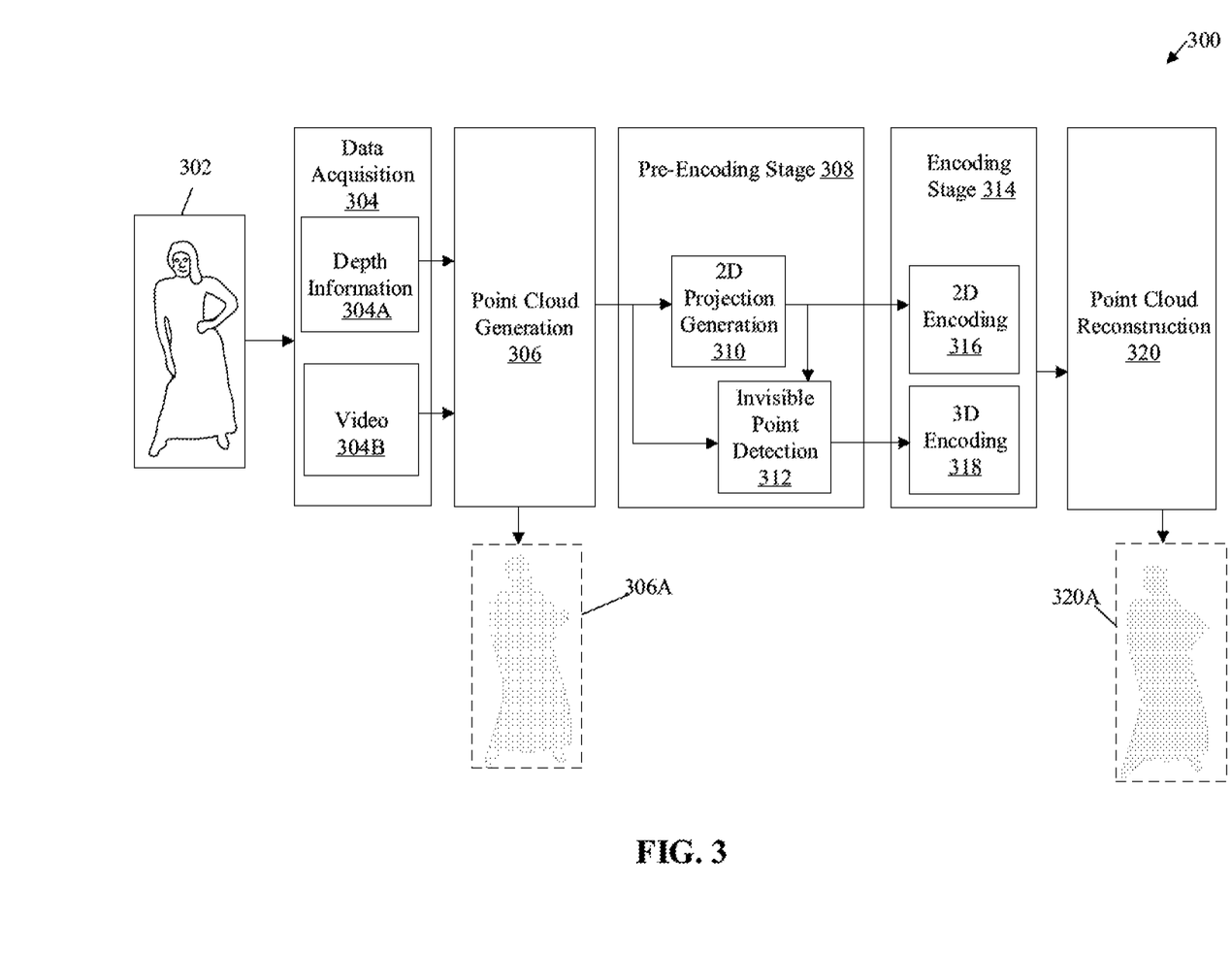
FIG. 3 illustrates an exemplary processing pipeline for hybrid projection-based point cloud texture coding, in accordance with an embodiment of the disclosure.

FIG. 3, illustrates an exemplary processing pipeline for generation and encoding of a 3D geometrical representation of the point cloud, in accordance with an embodiment of the disclosure. FIG. 3 is explained in conjunction with elements from FIG. 1 and FIG. 2. With reference to FIG. 3, there is shown a processing pipeline 300 to depict generation, and encoding of a 3D geometrical representation of the point cloud 306A by operations 304 to 320. There is also shown a 3D object 302, for example, a human object in this case. The 3D object 302 may be moving or deforming object in a 3D physical space. One or more sensing devices, such as each of the plurality of sensing devices 104A to 104N, may be configured to capture a video 304B and corresponding depth information 304A of the 3D object 302 from different viewing angles.

At 304, the processor 204 may be configured to execute data acquisition operation. The processor 204 may be configured to acquire the video 304B and the corresponding depth information 304A from each of the plurality of sensing devices 104A to 104N. In some embodiments, the processor 204 may be configured to receive the video 304B and the corresponding depth information 304A from one or more of the plurality of sensing devices 104A to 104N. In some embodiments, the processor 204 may be configured to acquire device parameters of each of the plurality of sensing devices 104A to 104N to generate the 3D geometrical representation of the point cloud 306A. In accordance with an embodiment, the plurality of sensing devices 104A to 104N may be pre-calibrated for the synchronous capture of video of the 3D object 302 from different viewing angles. The device parameters may include, but are not limited to, an identifier (ID), a position, an angle, or device setting information of each of the plurality of sensing devices 104A to 104N.

At 306, the processor 204 may be configured to execute a point cloud generation operation. The point cloud generation operation may be executed using conventional 3D data representation techniques to generate the 3D geometrical representation of the point cloud 306A of the 3D object 302.

The processor 204 may generate the 3D geometrical representation of the point cloud 306A based on the captured video 304B and/or the corresponding depth information 304A. The 3D geometrical representation of the point cloud 306A may be the output of the point cloud generation operation. For example, the processor 204 may generate a first set of points associated with corresponding geometrical information (i.e., 3D coordinates) and texture information that represents of the 3D view of the 3D object 302.

In conventional systems, the 3D geometrical representation of the point cloud 306A is directly encoded without additional pre-processing. In such systems, a conventional 3D coding architecture utilizes a 3D transform (such as the RAHT transform) and entropy encoding, such as the 7-ZIP encoding method, and the like, to encode the texture information of the 3D geometrical representation of the point cloud 306A. Such approach may lead to inaccurate encoding of the 3D geometrical representation of the point cloud 306A. Further, in some other conventional systems, a 2D coding architecture utilizes the plurality of projections of the 3D geometrical representation of the point cloud 306A to encode the 3D geometrical representation of the point cloud 306A using the conventional 2D image encoding techniques. The encoding of the plurality of projections may introduce distortions because some points of the 3D geometrical representation of the point cloud 306A may be occluded. Such occluded points are known as the set of invisible points which are not encoded by the 2D encoder 208, and this lead to distortion in the encoding of the point cloud. In contrast to existing techniques, the processor 204 may be configured to compress the 3D geometrical representation of the point cloud 306A by generating the plurality of 2D projections from the 3D geometrical representation of the point cloud, and detecting occluded points (such as the set of invisible points), as shown at 312.

At 308, the processor 204 may be further configured to execute pre-encoding operations such as 2D projection generation operation 310 and invisible point detection operation 312, at the pre-encoding stage 308. At 310, the processor 204 may be configured to execute the 2D projection generation operation to generate the plurality of 2D projections from the 3D geometrical representation of the point cloud 306A. The processor 204 may project the texture of the 3D geometrical representation of the point cloud 306A from a 3D plane to a specific 2D plane, to generate the plurality of 2D projections. The processor 204 may be configured to execute the 2D projection generation operation using a 2D projection description technique.

In accordance with an embodiment, the plurality of 2D projections may be cube map projections. The processor 204 may be configured to render the 3D geometrical representation of the point cloud 306A six times (as a cube has six faces) from the first view point of the plurality of different viewpoints of the 3D geometrical representation of the point cloud 306A, to generate the plurality of 2D projections as the cube map projections. The plurality of 2D projections, as the cube projections, may correspond to six 2D projections that may include the texture of the 3D object 302. In accordance with an embodiment, the plurality of 2D projections may be orthogonal projections. The processor 204 may be configured to generate the 2D projection of the 3D geometrical representation of the point cloud 306A, based on conventional transforms used in computer graphics, such as affine transformation and the like. In accordance with an embodiment, the plurality of 2D projections may be cylindrical projections. The plurality of 2D projections, as the cylindrical projections, may be associated with a set of maps in which cylinders may be wrapped around the 3D object 302. Further, the set of maps may be unwrapped and a set of rectangular shaped maps may be obtained as the plurality of 2D projections. The processor 204 may be configured to map the texture of the 3D geometrical representation of the point cloud 306A on a plurality of cylindrical surfaces to generate the cylindrical projections, based on the geometrical information and the texture information of the 3D geometrical representation of the point cloud 306A.

At 312, the processor 204 may be configured to execute an invisible point detection operation to detect the set of invisible points (i.e. the second set of points as described in FIG. 1) that may be occluded in the plurality of 2D projections of the 3D geometrical representation of the point cloud 306A. The processor 204 may be configured to detect the set of invisible points from the 3D geometrical representation of the point cloud 306A based on the plurality of 2D projections. The set of invisible points may also be referred to as occluded points. In accordance with an embodiment, the processor 204 may be configured to extract identify a third set of points that are not occluded points from the 3D geometrical representation of the point cloud 306A, corresponding to the plurality of 2D projections. The processor 204 may be configured to remove the third set of points from the first set of points of the 3D geometrical representation of the point cloud 306A. The processor 204 may be further configured to detect the second set of points as the set of invisible points based on the removal of the third set of points of the plurality of 2D projections from the first set of points of the 3D geometrical representation of the point cloud 306A.

In accordance with an embodiment, the processor 204 may be further configured to adaptively control orientation of the plurality of 2D projections based on movement of the 3D object 302. The processor 204 may be configured to generate the 2D projections from the 3D geometrical representation of the point cloud 306A, based on a first pose of the 3D object 302. The processor 204 may be further configured to detect a change in the first pose (e.g., a dancing pose of human object) to a second pose of the 3D object 302 based on comparison of a plurality of image frames of the captured video 304B. The processor 204 may be further configured to generate a plurality of 2D projections based on the detection of the second pose of the 3D object 302, other than the plurality of 2D projections associated with the first pose. Accordingly, the processor 204 may be further configured to update the second set of points (i.e. the set of invisible points) that may be occluded based on the second plurality of 2D projections for the second pose of the 3D object 302.

At 314, after the generation of the plurality of 2D projections and the detection of the set of invisible points, the encoding circuit 206 may be further configured to distinctly (i.e., separately) encode each of the plurality of 2D projections and the set of invisible points, via the 2D encoder 208 and the 3D encoder 210 respectively. At 316, the 2D encoder 208 may be configured to encode the plurality of 2D projections. In accordance with an embodiment, the 2D encoder 208 may be configured to determine the texture information of the plurality of 2D projections, based on the first set of points of the 3D geometrical representation of the point cloud. The 2D encoder 208 may be further configured to encode the texture information associated with the plurality of 2D projections. At 318, the 3D encoder 210 may be configured to encode the set of invisible points. Further, the 3D encoder 210 may be configured to determine the texture information associated with the set invisible points, based on the first set of points of the 3D geometrical representation of the point cloud 306A. The 3D encoder 210 may be further configured to encode the texture information of the set of invisible points. The encoded plurality of 2D projections may correspond to a first bitstream, and the encoded set of invisible points may correspond to a second bitstream.

In accordance with an embodiment, the processor 204 may be further configured to transmit the encoded plurality of 2D projections and the encoded set of invisible points (as the first bitstream and the second bitstream) to at least one of the plurality of external media devices 114A, 114B, ..., 114N, via the communication network 112 (FIG. 1). The processor 204 may be configured to transmit the encoded plurality of 2D projections and the encoded set of invisible points to the at least one of the plurality of external media devices 114A, 114B, ..., 114N, based on one of a plurality of transmission modes. The processor 204 may be configured to receive device information related to rendering capability of the plurality of external media devices 114A, 114B, ..., 114N, from the plurality of external media devices 114A, 114B, ..., 114N. The device information may indicate an ability of the plurality of external media devices 114A, 114B, ..., 114N to reconstruct encoded information (as the first bitstream and the second bitstream) for display. The device information may indicate the ability of one of the plurality of external media devices 114A, 114B, ..., 114N to reconstruct 2D information and/or 3D information.

In accordance with an embodiment, the encoding circuit 206 may be configured to transmit the encoded information based on the determination of one of the plurality of transmission modes. The processor 204 may determine a first transmission mode based on the device information of a first external media device 114A from the plurality of external media devices 114A, 114B, ..., 114N. In accordance with the first transmission mode, the hybrid encoding circuit 206 may be configured to merge the first bitstream and the second bitstream into a third bitstream based on the received device information of the first external media device 114. Accordingly, the processor 204 may be further configured to transmit the third bitstream to the first external media device 114A based on the first transmission mode, via the communication network 112.

In accordance with an embodiment, the processor 204 may be further configured receive the device information from a second external media device 114B from the plurality of external media devices 114A, 114B, ..., 114N. The processor 204 may be further configured to determine a second transmission mode from the plurality of transmission modes, based on the received device information. The received device information may indicate an ability of the second external media device 114B to render only one of the 3D information or the 2D information. Accordingly, the hybrid encoding circuit 206 may transmit only one of the first bitstream and the second bitstream to the second external media device 114B, based on the determined second transmission mode. Thus, the processor 204 and the hybrid encoding circuit 206 provide a scalability feature to the apparatus 102 to transmit only a part of the encoded information instead of the entire encoded information to one of the plurality of external media devices 114A, 114B, ..., 114N, based on communication with the plurality of external devices 114A, 114B, ..., 114N. Such capability of the processor 204 and the hybrid encoding circuit 206 may reduce bandwidth consumption, reduce processing time, and increase efficiency of the apparatus 102. In accordance with an embodiment, the decoding circuit 218 of one of the plurality of external media device 114A, 114B, ..., 114N may be configured to receive at least one of the first bitstream or the second bit stream from the apparatus 102 based on the corresponding device information, via the communication network 112.

At 320, the decoding circuit 218 may be further configured to execute a point cloud reconstruction operation. The decoding circuit 218 may be configured to decode the received at least the first bitstream or the second bitstream using a 2D image decoding technique, a 3D object decoding technique, or a combination of the 2D image decoding and 3D object decoding technique. Thus, one of the plurality of external media devices 114A, 114B, ..., 114N may reconstruct the 3D geometrical representation of the point cloud 306A (such as a 3D geometrical representation of reconstructed point cloud 320A in FIG. 3) previously encoded by the apparatus 102.

Figure 4:
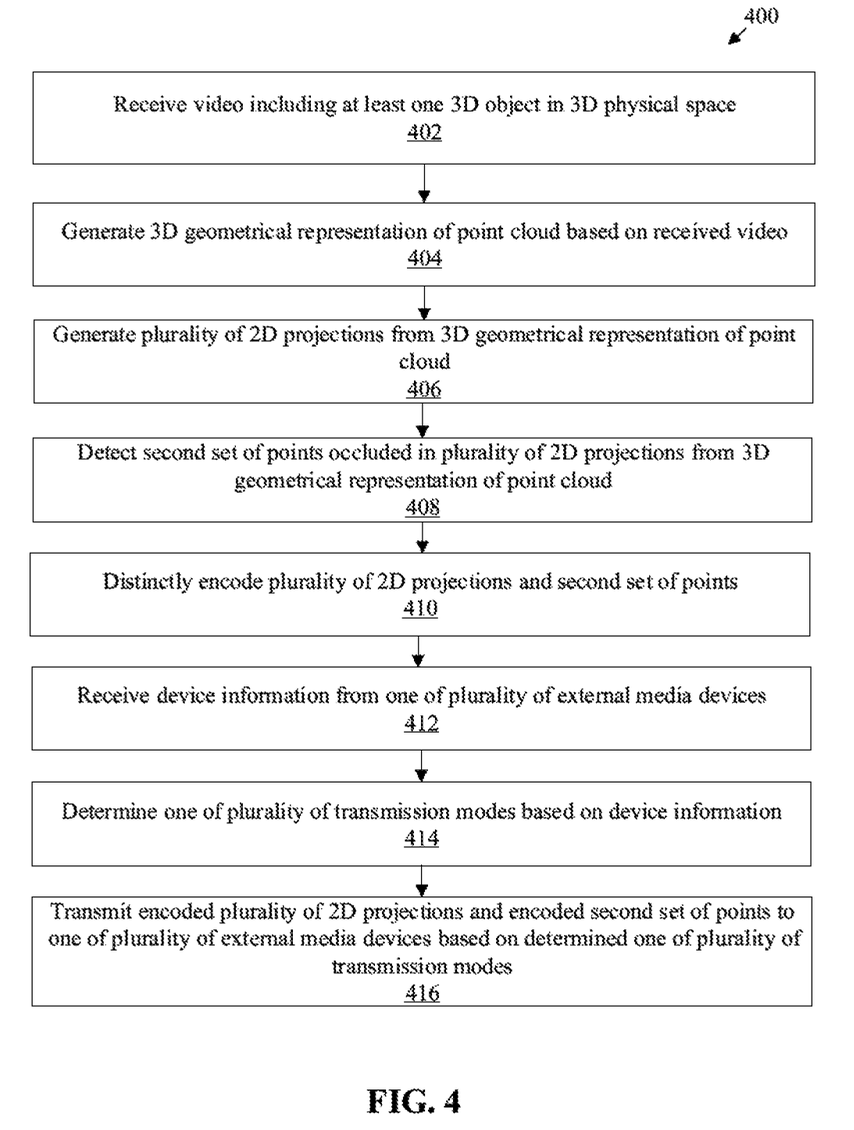
FIG. 4 is a flowchart that illustrates exemplary operations for hybrid projection-based point cloud texture coding, in accordance with an embodiment of the disclosure.

FIG. 4 depicts a flowchart that illustrates exemplary operations of hybrid projection-based point cloud texture coding, in accordance with an embodiment of the disclosure. With reference to FIG. 4, there is shown a flowchart 400. The flowchart 400 is described in conjunction with FIGS. 1, 2, and 3. The operations 402 to 416 may be implemented in the apparatus 102. The operations in the flowchart 400 starts at 402.

At 402, the video 304B including the 3D object 302 in the 3D physical space may be received. The processor 204 may be configured to receive the video 304B that may include the 3D object 302 in the 3D physical space, from the plurality of sensing devices 104A to 104N. The operation for reception of the video 304B has been described in detail, for example, in FIG. 1.

At 404, the 3D geometrical representation of the point cloud (e.g., the 3D geometrical representation of the point cloud 306A) may be generated based on the received video 304B. The processor 204 may be further configured to generate the 3D geometrical representation of the point cloud 306A based on the received video 304B. The 3D geometrical representation of the point cloud 306A may include a first set of points associated with geometrical information and texture information corresponding to the 3D object 302. The operation for generation of the 3D geometrical representation of the point cloud 306A has been described in detail, for example, in FIG. 3.

At 406, the plurality of 2D projections from the 3D geometrical representation of the point cloud 306A may be generated. The processor 204 may be configured to generate the plurality of 2D projections from the 3D geometrical representation of the point cloud 306A. The generation of the plurality of 2D projections has been described in detail, for example, in FIG. 3.

At 408, a second set of points (e.g., the set of invisible points) that are occluded in the plurality of 2D projections may be detected, from the 3D geometrical representation of the point cloud 306A. The processor 204 may be configured to detect the second set of points (such as the invisible points of FIG. 3) that may be occluded during the generation of the plurality of 2D projections from the 3D geometrical representation of the point cloud 306A. The detection of the set of invisible points has been described in detail, for example, in FIG. 3.

At 410, the plurality of 2D projections and the second set of points (e.g., the set of invisible points) may be distinctly encoded. The encoding circuit 206 may be configured to distinctly encode the plurality of 2D projections and the second set of points (e.g., the set of invisible points). The encoding of the plurality of 2D projections and only the second set of points (i.e., the set of invisible points) has been described in detail, for example, in FIG. 1 and FIG. 3.

At 412, device information from one of the plurality of external media devices 114A, 114B, . . . , 114N may be received. The processor 204 may be configured to receive the device information from one of the plurality of external media devices 114A, 114B, . . . , 114N. The reception of the device information from one of the plurality of external media devices 114A, 114B, . . . , 114N has been described in detail, for example, in FIG. 3.

At 414, one of the plurality of transmission modes may be determined, based on the received device information. The processor 204 may be configured to determine one of the plurality of transmission modes based on the received device information associated with one of the plurality of external media devices 114A, 114B, . . . , 114N. The determination of one of the plurality of the transmission modes has been described in detail, for example, in FIG. 3.

At 416, the encoded plurality of 2D projections and the encoded second set of points (e.g., the set of invisible points) may be transmitted to one the plurality of external media devices 114A, 114B, . . . , 114N, based on the determined one of the plurality of transmission modes. The processor 204 may be configured to transmit the encoded plurality of 2D projections and the encoded second set of points (e.g., the set of invisible points) to one of the plurality of external media devices 114A, 114B, . . . , 114N, based on the determined one of the plurality of transmission modes. The transmission of the encoded plurality of 2D projections and the encoded second set of points (e.g., the set of invisible points) has been described in detail, for example, in FIG. 3. The control passes to end.

In accordance with an embodiment of the disclosure, the apparatus, such as the apparatus 102 (FIG. 1), may comprise circuitry (such as the circuitry 202 (FIG. 2)). The circuitry 202 may be configured to receive a video (such as the video 304B (FIG. 3) that includes at least one three-dimensional (3D) object (such as the 3D object 302 (FIG. 3)) in a 3D physical space. The circuitry 202 may be further configured to generate a 3D geometrical representation of a point cloud (such as the 3D geometrical representation of the point cloud 306A) corresponding to the at least one 3D object 302 based on the received video 304B. The 3D geometrical representation of the point cloud 306A may comprise a first set of points associated with geometrical information and texture information corresponding to the at least one 3D object. The circuitry 202 may be further configured to generate a first plurality of two-dimensional (2D) projections from the 3D geometrical representation of the point cloud 306A, each 2D projection of the first plurality of 2D projections may represent a projection of texture from a first viewing angle of a plurality of different viewing angles of the 3D geometrical representation of the point cloud 306A of the at least one 3D object 302. The circuitry 202 may be further configured to detect a second set of points that may be occluded in the first set of points of the 3D geometrical representation of the point cloud 306A, corresponding to the first plurality of 2D projections. The circuitry 202 may be further configured to distinctly encode the first plurality of 2D projections and the detected second set of points that may be occluded. Remaining points, other than the detected second set of points, in the first set of points of the 3D geometrical representation of the point cloud 306A, may be discarded.

The circuitry 202 may be further configured to transmit a first bit stream that may include at least the encoded first plurality of 2D projections and the encoded second set of points to at least one of a plurality of devices (such as the plurality of external media devices 114A, 114B, . . . , 114N (FIG. 1)). The first plurality of 2D projections may be encoded based on one of a plurality of 2D image encoding techniques. The second set of points may be encoded based on one of the plurality of 3D object encoding techniques. The received video 304B may be captured from a plurality of viewpoints by a plurality of sensing devices (such as the plurality of sensing devices 104A to 104N (FIG. 1)).

The encoded first plurality of 2D projections may correspond to a first bitstream, and the encoded second set of points may correspond to a second bitstream. The circuitry 202 may be further configured to merge the encoded first plurality of 2D projections and the encoded second set of points into a third bitstream and transmit the third bitstream to at least one of a plurality of devices (such as the plurality of external media devices 114A, 114B, . . . , 114N (FIG. 1)).

The at least one 3D object 302 may be a moving object that may move in the 3D physical space. The first plurality of 2D projections and the detected second set of points may be associated with a first pose of the at least one 3D object 302 that may moving in the 3D physical space. The circuitry 202 may be further configured to detect a change in the first pose to a second pose of the at least one 3D object 302. The circuitry 202 may be further configured to generate a second plurality of 2D projections for the second pose of the at least one 3D object 302. The circuitry 202 may be further configured to update the second set of points that may be occluded in the first set of points of 3D geometrical representation of the point cloud 306A, corresponding to the second plurality of 2D projections for the second pose of the at least one 3D object 302. The circuitry 202 may be further configured to distinctly encode the second plurality of 2D projections and the updated second set of points that may be occluded. Each of the second plurality of 2D projections and the updated second set of points may be associated with the second pose of the at least one 3D object 302.

The apparatus 102 may be communicatively coupled to a plurality of devices (such as the plurality of external media devices 114A, 114B, . . . , 114N (FIG. 1)). The circuitry 202 may be further configured to receive, from the plurality of devices 114A, 114B, . . . , 114N, device information related to rendering capability of the plurality of devices 114A, 114B, . . . , 114N. The device information may indicate an ability of the plurality of devices 114A, 114B, . . . , 114N to reconstruct the encoded information for display. The circuitry 202 may be further configured to determine a transmission mode from a plurality of transmission modes in accordance with the received device information.

The circuitry 202 may be further configured to separately transmit a first bitstream and a second bitstream to a first device from the plurality of devices (such as one external media device 114A from the plurality of external media devices 114A, 114B, . . . , 114N (FIG. 1)) in a first transmission mode of the plurality of transmission modes, based on the received device information. The first bitstream may include the encoded first plurality of 2D projections. The second bitstream may include the encoded second set of points.

The circuitry 202 may be further configured to transmit a bitstream to a second device from the plurality of devices (such as one external media device 104B from the plurality of external media devices 114A, 114B, . . . , 114N (FIG. 1)) in a second transmission mode of the plurality of transmission modes, based on the received device information. The bitstream may include a combination of the encoded first plurality of 2D projections and the encoded second set of points.

The circuitry 202 may be further configured to determine the texture information associated with the first plurality of 2D projections based on the first set of points. The circuitry 202 may be further configured to encode the texture information associated with the first plurality of 2D projections based on one of a plurality of 2D image encoding techniques. The circuitry 202 may be further configured to determine the texture information associated with the second set of points based on the first set of points. The circuitry 202 may be further configured to encode the texture information associated with only the second set of points based on one of the plurality of 3D object encoding techniques.

The circuitry 202 may be further configured to project the texture of the 3D geometrical representation of the point cloud 306A on a specified 2D plane for the generation of the first plurality of 2D projections. The plurality of 2D projections may be 2D images that may be generated based on the projection of the texture of the 3D geometrical representation of the point cloud 306A on the specified 2D plane. The projection of the texture of the 3D geometrical representation of the point cloud 306A is a cube map projection of the 3D geometrical representation of the point cloud 306A.

The projection of the texture of the 3D geometrical representation of the point cloud 306A may correspond to orthogonal projections of the 3D geometrical representation of the point cloud 306A. The circuitry 202 may be further configured to detect the second set of points that may be occluded in the first set of points of the 3D geometrical representation of the point cloud 306A, corresponding to the orthogonal projections.

The projection of the texture of the 3D geometrical representation of the point cloud 306A may correspond to cylindrical projections of the 3D geometrical representation of the point cloud 306A. The circuitry 202 may be further configured to detect the second set of points that may be occluded in the first set of points of the 3D geometrical representation of the point cloud 306A, corresponding to the cylindrical projections.

Various embodiments of the disclosure may provide a non-transitory, computer-readable medium and/or storage medium, and/or a non-transitory machine readable medium and/or storage medium having stored thereon, instructions executable by a machine and/or a computer that comprises one or more circuits. The instructions may be executable by the machine and/or the computer to perform the steps that comprise reception of a video that may include at least one three-dimensional (3D) object in a 3D physical space. A 3D geometrical representation of a point cloud corresponding to the at least one 3D object may be generated, based on the received video. The 3D geometrical representation of the point cloud may comprise a first set of points associated with geometrical information and texture information corresponding to the at least one 3D object. A first plurality of two-dimensional (2D) projections from the 3D geometrical representation of the point cloud may be generated. Each 2D projection of the first plurality of 2D projections may represent a projection of texture from a first viewing angle of a plurality of different viewing angles of the 3D geometrical representation of the point cloud of the one 3D object. A second set of points that are occluded in the first set of points of the 3D geometrical representation of the point cloud may be detected. The second set of point may correspond to the first plurality of 2D projections. The first plurality of 2D projections and the detected second set of points that may be occluded may be distinctly decoded. Remaining points, other than the detected second set of points, in the first set of points of the 3D geometrical representation of the point cloud, may be discarded.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An apparatus, comprising:
   circuitry configured to:
   receive a video that includes at least one three-dimensional (3D) object in a 3D physical space;
   generate a 3D geometrical representation of a point cloud corresponding to the at least one 3D object based on the received video, wherein the 3D geometrical representation of the point cloud comprises a first set of points associated with geometrical information and texture information corresponding to the at least one 3D object;
   generate a first plurality of two-dimensional (2D) projections from the 3D geometrical representation of the point cloud, wherein each 2D projection of the first plurality of 2D projections represents a projection of texture from a first viewing angle of a plurality of different viewing angles of the 3D geometrical representation of the point cloud of the at least one 3D object;
   detect a second set of points that is occluded in the first set of points of the 3D geometrical representation of the point cloud, wherein the detected second set of points corresponds to the first plurality of 2D projections;
   distinctly encode the first plurality of 2D projections and the detected second set of points; and remove a third set of points, from the first set of points of the 3D geometrical representation of the point cloud, wherein the third set of points is different from the detected second set of points.

2. The apparatus according to claim 1, wherein the circuitry is further configured to transmit a first bit stream to at least one of a plurality of devices, and the first bit stream includes at least the encoded first plurality of 2D projections and the encoded second set of points.

3. The apparatus according to claim 1, wherein the circuitry is further configured to:
encode the first plurality of 2D projections based on one of a plurality of 2D image encoding techniques; and
encode the second set of points based on one of a plurality of 3D object encoding techniques.

4. The apparatus according to claim 1, wherein the received video is captured from a plurality of viewpoints by a plurality of sensing devices.

5. The apparatus according to claim 1, wherein
the encoded first plurality of 2D projections corresponds to a first bitstream,
the encoded second set of points corresponds to a second bitstream, and
the circuitry is further configured to:
merge the encoded first plurality of 2D projections and the encoded second set of points into a third bitstream; and
transmit the third bitstream to at least one of a plurality of devices.

6. The apparatus according to claim 1, wherein
the at least one 3D object is a moving object that moves in the 3D physical space, and
the first plurality of 2D projections and the detected second set of points are associated with a first pose of the at least one 3D object that moves in the 3D physical space.

7. The apparatus according to claim 6, wherein the circuitry is further configured to:
detect a change in the first pose to a second pose of the at least one 3D object;
generate a second plurality of 2D projections for the second pose of the at least one 3D object;
update the second set of points that is occluded in the first set of points of the 3D geometrical representation of the point cloud, wherein the updated second set of points corresponds to the second plurality of 2D projections; and
distinctly encode the second plurality of 2D projections and the updated second set of points, wherein the second plurality of 2D projections and the updated second set of points are associated with the second pose of the at least one 3D object.

8. The apparatus according to claim 1, wherein
the apparatus is communicatively coupled to a plurality of devices, and
the circuitry is further configured to:
receive, from the plurality of devices, device information related to rendering capability of the plurality of devices, wherein the device information indicates an ability of the plurality of devices to reconstruct encoded information for display; and
determine a transmission mode from a plurality of transmission modes based on the received device information.

9. The apparatus according to claim 8, wherein
the circuitry is further configured to separately transmit, based on the received device information, a first bitstream and a second bitstream to a first device from the plurality of devices in a first transmission mode of the plurality of transmission modes,
the first bitstream includes the encoded first plurality of 2D projections, and
the second bitstream includes the encoded second set of points.

10. The apparatus according to claim 8, wherein
the circuitry is further configured to transmit, based on the received device information, a bitstream to a second device from the plurality of devices in a second transmission mode of the plurality of transmission modes, and
the bitstream includes a combination of the encoded first plurality of 2D projections and the encoded second set of points.

11. The apparatus according to claim 1, wherein the circuitry is further configured to:
determine texture information associated with the first plurality of 2D projections based on the first set of points;
encode the texture information associated with the first plurality of 2D projections based on one of a plurality of 2D image encoding techniques;
determine the texture information associated with the second set of points based on the first set of points; and
encode the texture information associated with only the second set of points based on one of a plurality of 3D object encoding techniques.

12. The apparatus according to claim 1, wherein
the circuitry is further configured to project the texture of the 3D geometrical representation of the point cloud on a specified 2D plane for the generation of the first plurality of 2D projections, and
the first plurality of 2D projections corresponds to 2D images that are generated based on the projection of the texture of the 3D geometrical representation of the point cloud on the specified 2D plane.

13. The apparatus according to claim 12, wherein the projection of the texture of the 3D geometrical representation of the point cloud is a cube map projection of the 3D geometrical representation of the point cloud.

14. The apparatus according to claim 12, wherein
the projection of the texture of the 3D geometrical representation of the point cloud corresponds to orthogonal projections of the 3D geometrical representation of the point cloud,
the circuitry is further configured to detect the second set of points that is occluded in the first set of points of the 3D geometrical representation of the point cloud, and
the detected second set of points corresponds to the orthogonal projections.

15. The apparatus according to claim 12, wherein
the projection of the texture of the 3D geometrical representation of the point cloud corresponds to cylindrical projections of the 3D geometrical representation of the point cloud,
the circuitry is further configured to detect the second set of points that is occluded in the first set of points of the 3D geometrical representation of the point cloud, and
the detected second set of points corresponds to the cylindrical projections.

16. A method, comprising:
receiving, by circuitry in an apparatus, a video that includes at least one three-dimensional (3D) object in a 3D physical space;
generating, by the circuitry, a 3D geometrical representation of a point cloud corresponding to the at least one 3D object based on the received video, wherein the 3D geometrical representation of the point cloud comprises a first set of points associated with geometrical information and texture information corresponding to the at least one 3D object;
generating, by the circuitry, a first plurality of two-dimensional (2D) projections from the 3D geometrical representation of the point cloud, wherein each 2D projection of the first plurality of 2D projections represents a projection of texture from a first viewing angle of a plurality of different viewing angles of the 3D geometrical representation of the point cloud of the at least one 3D object;
detecting, by the circuitry, a second set of points that is occluded in the first set of points of the 3D geometrical representation of the point cloud, wherein the detected second set of points corresponds to the first plurality of 2D projections;
distinctly encoding, by the circuitry, the first plurality of 2D projections and the detected second set of points; and
removing, by the circuitry, a third set of points from the first set of points of the 3D geometrical representation of the point cloud, wherein the third set of points is different from the detected second set of points.

17. The method according to claim 16, wherein
the at least one 3D object is a moving object that moves in the 3D physical space, and
the first plurality of 2D projections and the detected second set of points are associated with a first pose of the at least one 3D object that moves in the 3D physical space.

18. The method according to claim 17, further comprising:
detecting, by the circuitry, a change in the first pose to a second pose of the at least one 3D object; and
generating, by the circuitry, a second plurality of 2D projections for the second pose of the at least one 3D object.

19. The method according to claim 18, further comprising:
updating, by the circuitry, the second set of points that is occluded in the first set of points of the 3D geometrical representation of the point cloud, wherein the updated second set of points corresponds to the second plurality of 2D projections; and
distinctly encoding, by the circuitry, the second plurality of 2D projections and the updated second set of points, wherein each of the second plurality of 2D projections and the updated second set of points are associated with the second pose of the at least one 3D object.

20. The method according to claim 16, further comprising projecting, by the circuitry, the texture of the 3D geometrical representation of the point cloud on a specified 2D plane for the generation of the first plurality of 2D projections, wherein the first plurality of 2D projections corresponds to 2D images that are generated based on the projection of the texture of the 3D geometrical representation of the point cloud on the specified 2D plane.

* * * * *